May 8, 1923.
L. E. VAN HISE
FLUID METER
Filed Oct. 4, 1920
1,454,301
2 Sheets-Sheet 1
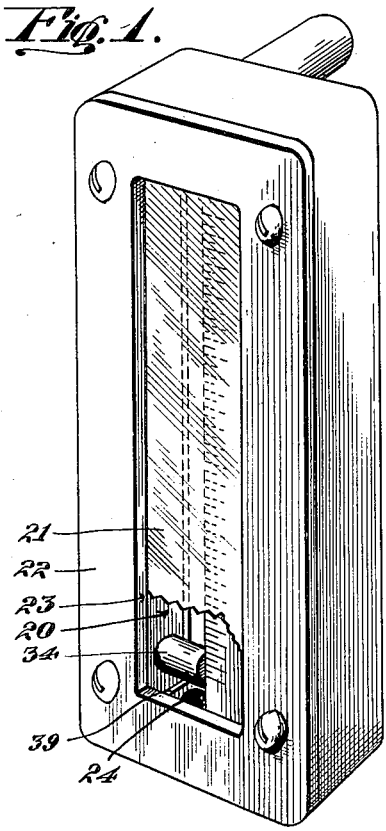
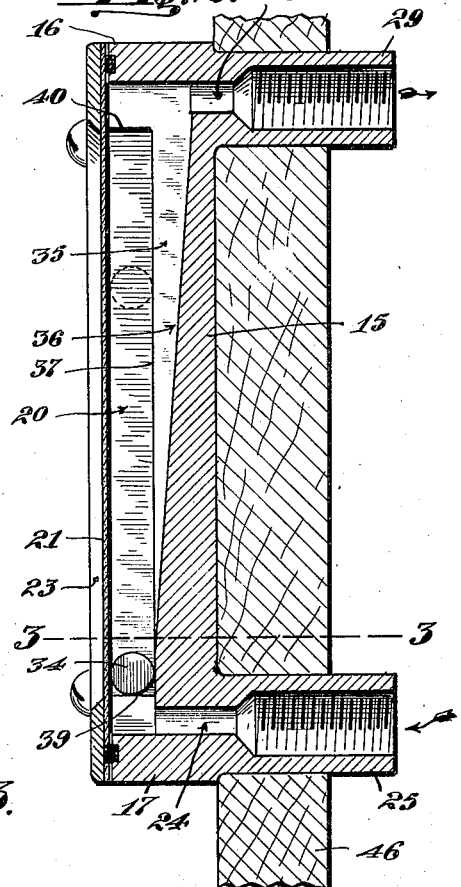
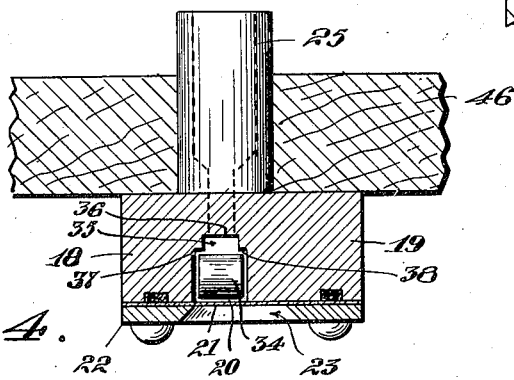
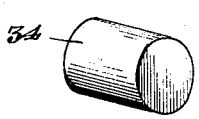
INVENTOR
Lester E. Van Hise;
By R. S. Berry,
Attorney.

May 8, 1923.  
L. E. VAN HISE  
FLUID METER  
Filed Oct. 4, 1920  
1,454,301  
2 Sheets-Sheet 2
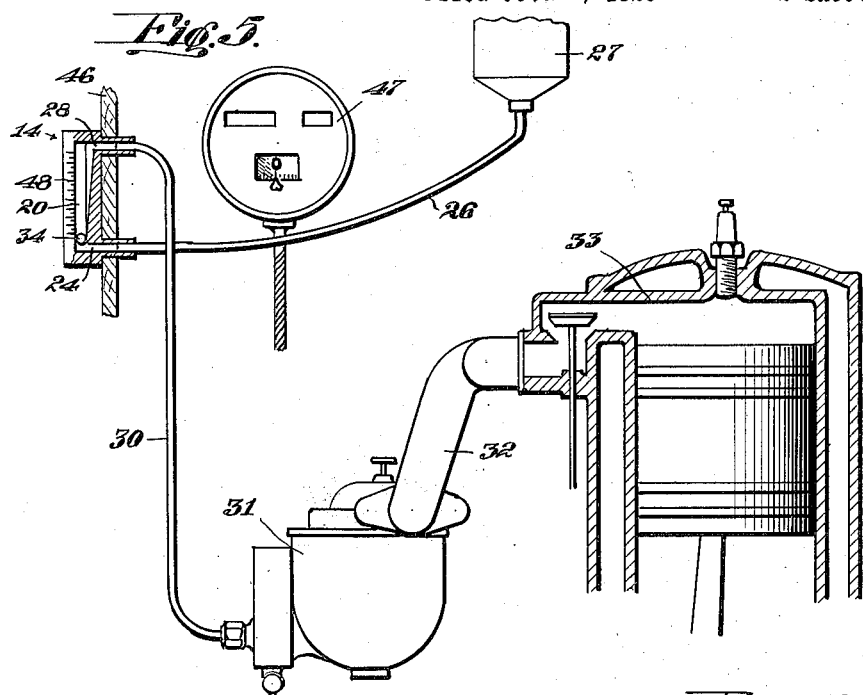
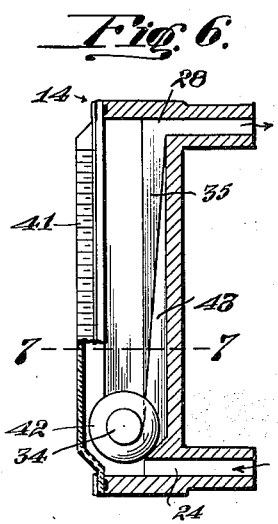
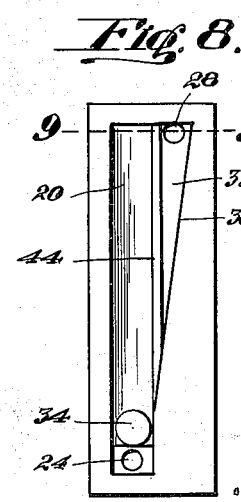
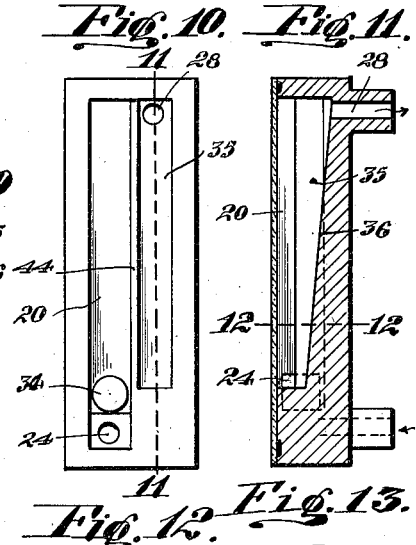
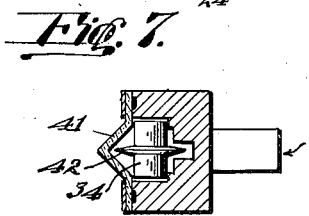
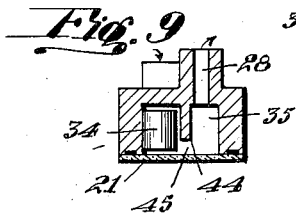
INVENTOR  
Lester E. Van Hise  
By R. S. Berry  
Attorney.

Patented May 8, 1923.

1,454,301

UNITED STATES PATENT OFFICE.

LESTER E. VAN HISE, OF LOS ANGELES, CALIFORNIA, ASSIGNOR OF ONE-THIRD TO JAMES V. BALDWIN, ONE-THIRD TO PERCY F. HOWELL, AND ONE-THIRD TO GEORGE E. McCREERY, ALL OF LOS ANGELES, CALIFORNIA.

FLUID METER.

Application filed October 4, 1920. Serial No. 414,673.

*To all whom it may concern:*

Be it known that I, LESTER E. VAN HISE, a citizen of the United States, residing at Los Angeles, in the county of Los Angeles and State of California, have invented new and useful Improvements in Fluid Meters, of which the following is a specification.

This invention relates to a device for indicating variations in the flow of fluids, and particularly pertains to an indicator which is especially applicable for use in conjunction with an internal combustion engine for designating the volume of the hydrocarbon vapors delivered to the carburetor and thence to the engine cylinders at any given moment.

An object of this invention is to provide an instrument adapted to be installed in the fuel line leading to the carburetor of an internal combustion engine in an auto vehicle and to be associated with a speedometer, whereby the operator may determine at any instant and at any engine speed the exact rate of fuel consumption per hour of his vehicle, and also ascertain the mileage made per gallon at any moment so as to give an accurate check at all times on the running condition of the motor and vehicle.

Another object of this invention is to provide a device of the above character of the type embodying a loose weighted element arranged in a chamber through which the fluid is to flow; the weighted element being adapted to be supported by the flowing fluid and moving upwardly with increase in the rate of flow of the fluid and gravitating downwardly on decrease in the rate of flow.

A further object is to provide an indicating element of such shape and so arranged as to permit ready movement thereof and obviate any possibility of its sticking or jamming and thereby insure its proper functioning.

Another object is to provide a device of the above character with a by-pass of gradually increasing cross sectional area in the direction of the flow of the fluid with the by-pass arranged along one side of the chamber in which the indicating element travels and arranged in open communication therewith in such manner that the indicator when disposed at various positions in the chamber under the action of fluid flowing therethrough will form with the by-pass a variable port area according to the velocity of the fluid and which by-pass will remain open and unobstructed throughout irrespective of the position of the indicating element.

Another object is to provide a construction in the indicator whereby the movable indicating element cannot cut off the flow of fluid through the indicator.

Other objects will appear hereinafter.

The invention is illustrated in the accompanying drawings, in which:

Figure 1 is a perspective view of the fluid meter with parts broken away.

Figure 2 is a view of same as seen in vertical section.

Figure 3 is a view in horizontal section as seen on the line 3—3 of Figure 2.

Figure 4 is a perspective view of the indicating element.

Figure 5 is a diagram illustrating the application of the invention.

Figure 6 is a view in vertical section showing a modified form of the invention.

Figure 7 is a view in horizontal section as seen on the line 7—7 of Figure 6.

Figure 8 is a view in front elevation showing another modified form of the invention.

Figure 9 is a view in horizontal section as seen on the line 9—9 of Figure 8.

Figure 10 is a view in elevation illustrating a further modified form of the invention.

Figure 11 is a view in vertical section as seen on the line 11—11 of Figure 10.

Figure 12 is a view in horizontal section as seen on the line 12—12 of Figure 11.

Figure 13 is a view illustrating the rotary indicating element showing it in a spherical form.

In carrying out my invention in the preferred embodiment, as particularly shown in Figures 1 to 5 inclusive, I employ a casing 14 embodying a back wall 15, top and bottom walls 16 and 17, and side walls 18 and 19 forming the casing with a channel 20 which is closed by a transparent plate 21 extending over the outer face of the casing and secured in place by a face plate 22 having a vertically extending slot 23 arranged opposite the channel 20 to expose the latter through the plate 21. The channel 20 constitutes a chamber through which the liquid to be measured is designed to flow and communicating with the chamber at its lower end is an intake passage 24 extending through a nipple 25 adapted to be connected through the feed pipe 26 leading from any suitable source of hydrocarbon supply indicated at 27, and which source may comprise a reservoir or a vacuum tank interposed in the feed pipe line. Communicating with the upper end of the chamber is an outlet passage 28 leading through a nipple 29 adapted to connect with a conduit 30 leading to the carburetor 31 connected by the usual intake manifold 32 to an engine cylinder 33.

An important feature of the present invention resides in the manner of forming the channel or chamber 20 and arranging an indicating member therein and forming same.

In the preferred form of the invention, the channel 20 is formed with a vertically extending recess portion 35 constituting a by-pass and the bottom wall 36 of which is formed by the back wall 15 and is inclined from a point adjacent the intake passage 24 to the outlet passage 28, so that the by-pass has a gradually increasing cross sectional area as it progresses upwardly. The recess portion or by-pass is of a width less than the width of the channel 20, so as to form a pair of shoulders 37 and 38 along the marginal edges of the by-pass which extends parallel with the cover plate 21 and constitute with the latter guide ways between which the indicating member 34 is vertically movable. The indicating members 34 is cylindrical in form and arranged with its axis extending horizontally, transversally across the channel 20 and is of such diameter that its circumferential face will be positioned quite close to the shoulders 37—38 and the plate 21, so that the indicating member may freely revolve in traversing the channel in either direction and thereby have a rolling contact with its guide members. The indicating member is of such length that its ends will be spaced a short distance from the side walls of the channel 20 to afford free movement of the indicating element, yet practically close the channel against the passage of fluid therethrough. A shoulder 39 is formed in the side walls of the channel above the intake passage 24, on which the indicating element is adapted to seat when in its lowermost position, to prevent the indicating element from closing the inlet passage 24. A shoulder 40 is formed in the side walls of the channel immediately below the outlet passage 28 for limiting the upward movement of the indicating element.

In the form of the invention shown in Figures 6 and 7, the transparent cover plate is formed with an outwardly extending portion 41 having tapered side walls, and the indicating member is formed with a central flange 42 which extends between the tapered walls 41, so that the position of the indicating member may be readily seen from the side of the device. In this arrangement the bottom wall of the by-pass is formed with a groove 43 to accommodate the flange 42. In some instances, the cover plate may be inclined relative to the back wall to form the tapered by-pass.

In the form of the invention shown in Figures 8 and 9, the by-pass 35 is located at one side of the channel 20 and the inclined wall 36 thereof is located at the side of the by-pass opposite the communication with the channel 20; the by-pass and the channel being separated in part by a partition 44, but having communication through a space 45 extending between the partition and the cover plate 21.

In the form of the invention shown in Figures 10 and 12 inclusive, an arrangement substantially corresponding to that shown in Figures 8 and 9 is employed, except that the inclined wall 36 of the by-pass 35 is arranged in the bottom wall of the by-pass.

Where the by-pass is arranged to one side of the channel, the inlet passage 24 communicates with the lower end of the channel and the outlet passage leads from the upper end of the by-pass.

By arranging the outlet to lead from the upper portion of the by-pass, an open communication is afforded from the by-pass at all times, which insures against the outlet being closed by the indicating element when the latter is in its uppermost position and permits the continued flow of fluid through the indicator at all times irrespective of the position of the indicating element.

In the application and operation of the invention, the indicator is disposed at any convenient point in a gas line or feed pipe leading from the source of hydrocarbon supply to the carburetor; being preferably disposed on the instrument board 46 of an auto vehicle adjacent to a speedometer 47, so that the indications noted by the meter may be read in conjunction with the speed indications of the speedometer.

The device is also disposed in substantially a vertical position and so arranged as to be filled with the liquid to be measured. The indicating element is submerged in the liquid and normally rests in its lowermost position, in which position it substantially closes the vertical channel to the intake passage, with the latter, however, opening at a point beneath the indicating element so that on the slightest volume of flow of the liquid into the device the indicating element will be lifted and supported in an elevated position according to the velocity and volume of flow of the liquid; the indicating element moving upwardly as the flow increases and moving downwardly under gravity as the flow decreases. A scale 48 is provided at any convenient point adjacent the path of travel of the indicating element and adapted to be read according to the various positions of the indicating element to denote the volume of the liquid passing through the meter at any moment. By comparing the reading of the scale with the speed of travel of the vehicle indicated on the speedometer the number of gallons of liquid fed to the carburetor per mile of travel will be designated. The indicating element on moving upwardly opens communication to the by-pass, the cross sectional area of which gradually increases as the indicating element advances and decreases on retrograde movement of the indicating element.

An important feature of the invention resides in forming the indicating element of such shape that it will revolve in its mounting, thus minimizing the possibility of it sticking and not properly functioning. In some instances the indicating element may be made spherical and I, therefore, do not limit myself to the cylindrical form, the essential feature being that it is adapted to revolve.

By the use of this invention the operator of an auto vehicle may determine at any moment the volume of fuel consumed by the engine per unit of time whether the vehicle is in motion or not; the graduations being so spaced and numbered relative to movement of the indicating element under various velocities of the fluid acting thereon as to accurately measure the quantity of fluid passing out the discharge within a certain period of time, such as gallons and fractions thereof, that would pass through the meter at various velocities in say, one hour.

Knowing from previous tests the volume of fuel required to operate the engine under various conditions as when idling and propelling the vehicle under normal driving conditions, any increase in the fuel consumption shown by the indicator will denote the presence of trouble. When the vehicle is in motion and the speedometer in operation to indicate the speed of the vehicle in miles per hour, the meter read jointly with the speedometer will give at a glance the correct number of miles per gallon the vehicle is running. For example, assume that the speedometer reading is twenty miles per hour and the meter reading has been brought to one gallon, then the two readings taken together would show that the vehicle would travel twenty miles in one hour on one gallon of fuel. In this manner the operator may determine by tests the most economical speed at which his vehicle may be driven so as to get the greatest possible mileage per gallon.

I claim:
1. A device for indicating the flow of fluids, comprising a casing formed with a chamber and having a by-pass passage arranged alongside said chamber in open communication therewith throughout the length of the passage, an inlet conduit opening to the lower end of the chamber, an outlet conduit laeding from the upper end of the passage, and a revolvable indicator element movable longitudinally of said chamber and rollable in the direction of its path of travel.

2. A device for indicating the flow of fluids, comprising a casing formed with a chamber and having a by-pass passage arranged alongside said chamber in open communication therewith throughout the length of the passage, an inlet conduit opening to the lower end of the chamber, an outlet conduit leading from the upper end of the passage, and a revolvable indicator element movable longitudinally of said chamber and guided therein, said indicator element being cylindrical in form and arranged with its axis extending transversally of the chamber.

3. A device for indicating the flow of fluids, comprising a casing formed with a chamber, a revolvable indicating element freely movable longitudinally of said chamber, a by-pass passage arranged alongside of said chamber in open communication therewith throughout the length of the passage, said passage having an inclined wall whereby its cross sectional area is gradually increased from one of its ends to the other, an inlet conduit opening to the chamber at the reduced end of the passage, and an outlet conduit leading from the enlarged end of the passage.

4. In a fluid meter, a casing formed with a guide channel, a revolvable indicating element movable longitudinally of said channel and extending substantially across the cross sectional area of said channel, means for directing an inflow of fluid to said channel beneath said indicating member, and means for directing a flow of fluid to one side of the path of travel of said indicating member said casing having a discharge passage with which said last named means communicates.

5. A device for indicating the flow of fluids, comprising a casing formed with a chamber and having a longitudinally extending by-pass passage in open communication therewith with an inlet opening to the lower portion of the chamber and an outlet leading from the upper portion of the by-pass passage, and an indicator element movable longitudinally of said chamber.

6. A device for indicating the flow of fluid, comprising a casing formed with a chamber and having a longitudinally extending by-pass passage in open communication therewith with an inlet opening to the lower portion of the chamber and an outlet leading from the upper portion of the by-pass passage, and an indicator element movable longitudinally of said chamber, said indicator element being adapted to roll in the direction of its path of travel.

7. A device for indicating the flow of fluid, comprising a casing formed with a chamber and having a longitudinally extending by-pass passage in open communication therewith with an inlet opening to the lower portion of the chamber and an outlet leading from the upper portion of the chamber, and an indicator element movable longitudinally of said chamber; a shoulder for limiting upward movement of said indicator element, said chamber, by-pass passage and outlet being so relatively arranged that communication between the by-pass passage and outlet will remain open when the indicator element is in its uppermost position.

8. In a fluid indicator, a casing, a chamber in said casing, guide-ways in said chamber, a freely movable indicator element mounted to roll on said guide-ways, inlet and outlet passages at the opposite end portions of said chamber, and a by-pass passage extending between said inlet and outlet passages.

9. In a fluid indicator, a casing, a chamber in said casing, guide-ways in said chamber, a freely movable indicator element mounted to roll on said guide-ways, inlet and outlet passages at the opposite end portions of said chamber, and a by-pass passage extending between said inlet and outlet passages; said by-pass passage increasing in cross-sectional area approaching the outlet passage.

LESTER E. VAN HISE.